350-96.15
8/4/81    XR    4,281,925    SR

United States Patent [19]
Forrest et al.

[11] 4,281,925
[45] Aug. 4, 1981

[54] FIBER OPTIC ATTENUATION SIMULATOR

[75] Inventors: John W. Forrest, West Acton; Robert D. Livingstone, Townsend, both of Mass.

[73] Assignee: Bowmar/Ali, Inc., Acton, Mass.

[21] Appl. No.: 62,594

[22] Filed: Jul. 31, 1979

[51] Int. Cl.³ ............................................. G01N 21/84
[52] U.S. Cl. ................ 356/73.1; 350/96.15; 356/243
[58] Field of Search ............ 356/73.1, 243, 244; 350/96.15

[56] References Cited
U.S. PATENT DOCUMENTS

| | | | |
|---|---|---|---|
| 3,127,464 | 3/1964 | Gustavson | 250/233 |
| 3,850,529 | 11/1974 | Brugger | 356/243 X |
| 3,972,618 | 8/1976 | Hawes | 356/244 |
| 3,994,601 | 11/1976 | Brugger | 356/243 X |
| 3,997,271 | 12/1976 | Brugger et al. | 356/243 X |
| 4,021,217 | 5/1977 | Bondybey et al. | 65/13 |
| 4,081,258 | 3/1978 | Goell et al. | 65/2 |
| 4,090,793 | 5/1978 | Lebduska | 356/73.1 |
| 4,135,779 | 1/1979 | Hudson | 350/96.15 X |

FOREIGN PATENT DOCUMENTS 2034344  1/1972  Fed. Rep. of Germany ........... 250/227

OTHER PUBLICATIONS

"Optical Attenuator With Bandpass Filtering", Mathisen, IBM Technical Disclosure Bulletin, vol. 21, #5, 10/78.

*Primary Examiner*—Vincent P. McGraw
*Attorney, Agent, or Firm*—Seidel, Gonda, Goldhammer & Panitch

[57] ABSTRACT

A fiber optic line simulator simulates the attenuation in a fiber optic cable with repeatable accuracy by adjusting the air spacing between the ends of two foreshortened fiber optic cables adapted to be connected to a continuity meter or other device for measuring attenuation in a fiber optic cable of extensive length. The simulator may also simulate specific fiber optic lengths for use in evaluation of optical communication systems.

6 Claims, 4 Drawing Figures

U.S. Patent   Aug. 4, 1981   Sheet 1 of 2   4,281,925
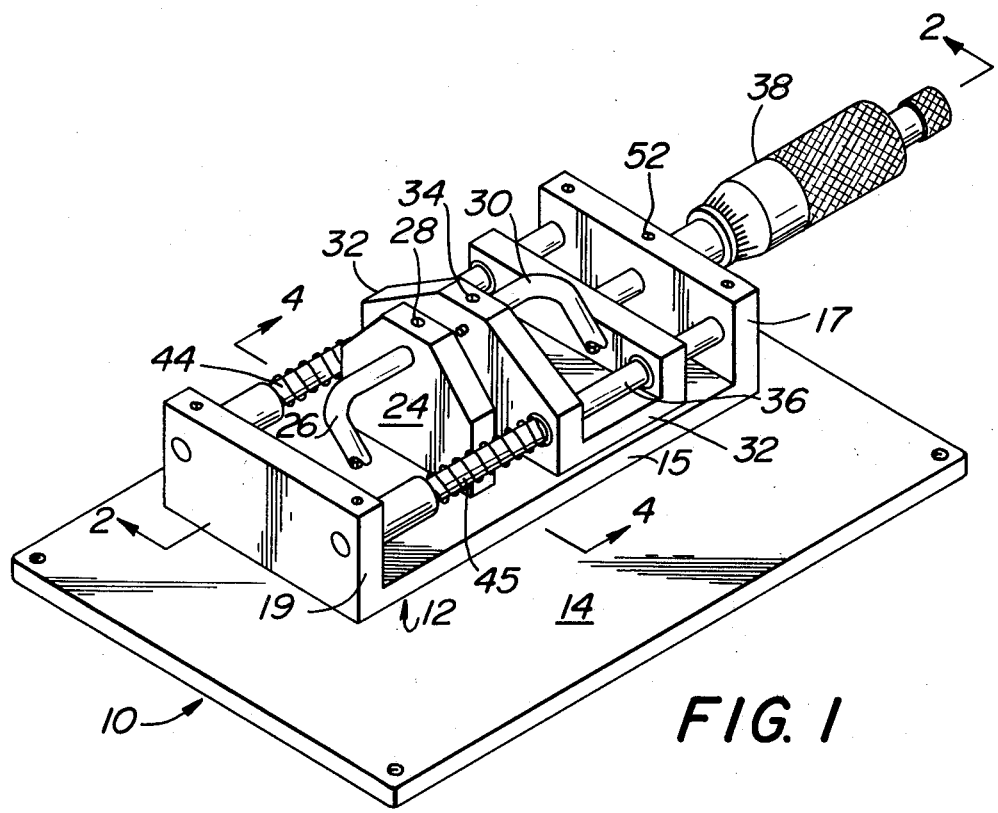
FIG. 1
FIG. 4
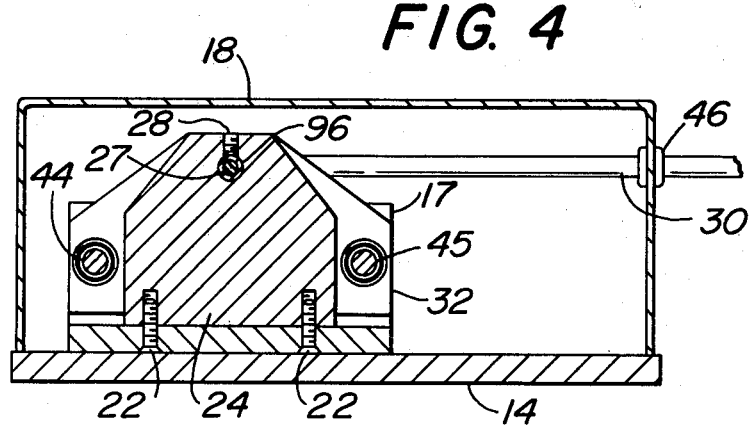

FIBER OPTIC ATTENUATION SIMULATOR

BACKGROUND OF THE INVENTION

Fiber optic cable of significant length (e.g., 500-5000 meters) is presently being put into use for data and communication links among other things. As with electrical cable, it is often necessary to test and evaluate the cables for continuity and attenuation during manufacturing, as installed, or while in use. Continuity meters which measure line loss in decibels have been developed and put to use. Such meters function by passing light from a source of known intensity through the fiber optic cable under test and comparing the intensity of the light received to the known intensity of the light transmitted from the source to determine line losses due to attenuation. Attenuation losses are usually measured in relative quantities such as decibels.

A continuity or attenuation meter, like any other test instrument, must be calibrated. Heretofore, the calibration procedure has required that it be connected to a set of fiber optic cables of known length so that the continuity meter can be calibrated across its full range. This has meant retaining large lengths of standardized cable in the laboratory or taking the meter into the field for connection to cables of known length and attenuation. Such procedures are obviously inconvenient because they require either the storage of bulky cables or the inconvenience of having to transport the meter to be a remote site for calibration. In both instances, a number of standard length test cables must be connected and disconnected from the continuity meter. Thus, the test is not continuous across the full scale range of the meter.

Sometimes it is desirable to simulate the normal attenuation of a fiber optic cable of definite length for evaluation of an optical communication system. Therefore, there is a need for an instrument that will simulate fiber optic tables of definite length rather than use standard length test cables.

The present invention overcomes the aforesaid difficulties in calibrating a continuity or related type meter by providing a fiber optic cable attenuation simulator which accurately and repeatably simulates the attenuation in a fiber optic cable of extensive length.

SUMMARY OF THE INVENTION

The present invention is an apparatus for precisely simulating the attenuation ordinarily present in a fiber optic cable. In accordance with the present invention, the ends of two foreshortened fiber optic cables adapted to be connected to a fiber optic attenuation or continuity meter are aligned along a common optical axis. The apparatus varies the air spacing between the ends of the cable while light is being passed through them. The amount of air spacing is calibrated to equal the attenuation in a fiber optic cable of significant length. More particularly, the present invention provides an apparatus for precisely and repeatably simulating the attenuation in a fiber optic cable which apparatus is relatively simple and inexpensive to manufacture. Such variable spacing between the ends of the fiber optic cables is provided by fixedly mounting one of the cable ends and reciprocably mounting the other cable end on a carriage yoke which moves on a side mechanism that takes the form of two precision ground shafts. By using a movable carriage yoke wherein the legs engage the slide at widely separated bearing points, wobble and other causes of shifting of the end of the fiber optic cable away from the optical axis are reduced enough to be well within the accuracy of the meter being calibrated.

For the purpose of illustrating the invention, there is shown in the drawings a form which is presently preferred; it being understood, however, that this invention is not limited to the precise arrangements and instrumentalities shown.

FIG. 1 is an isometric view of the fiber optic attenuation simulator with the enclosure cover removed.

FIG. 4 is a front elevation section taken along the line 4—4 in FIG. 1.

Figure 2:
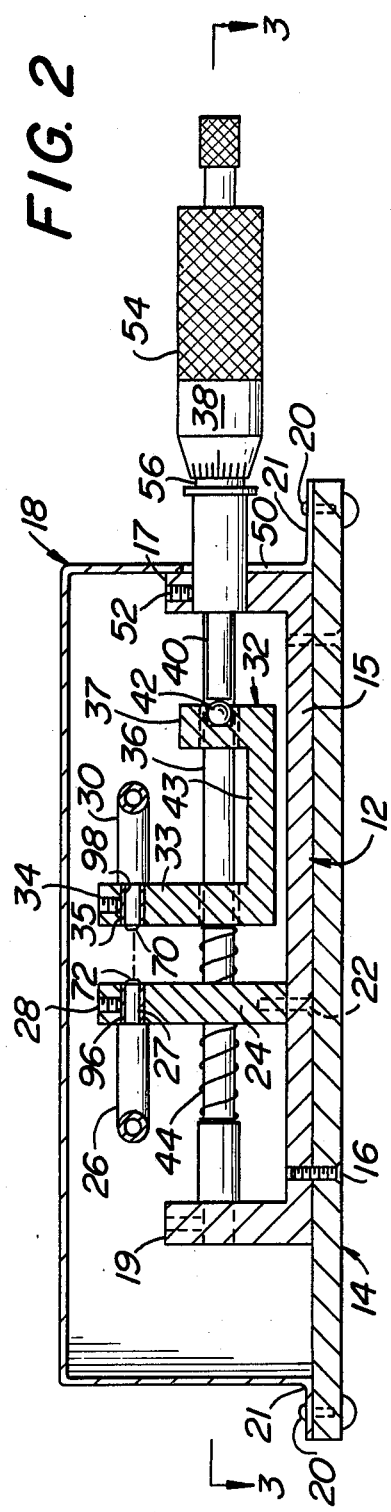
FIG. 2 is a side elevation section taken along the line 2—2 in FIG. 1.

Referring to the drawings in detail, wherein the numerals indicate like elements, there is shown a fiber optic attenuation simulator designated generally by the numeral 10 in FIG. 1.

As shown, the fiber optic attenuation simulator 10 includes a principal support 12 fixed by threaded fasteners or the like to the base plate 14 which together with the cover 18 (see FIGS. 2, 3 and 4) defines a light and dust tight enclosure for the apparatus 10. The cover 18 is removably fixed to base plate 14 so as to substantially exclude ambient light. For the purpose of this invention, it has been found sufficient to attach the cover 18 to the plate 14 by means of threaded fasteners 20 extendigng through the integral cover flanges 21.

As shown, the principal support 12 is in the form of a yoke comprising a base 15 and upstanding legs 17 and 19 which preferably are integral with the base 15 so that the entire principal support 12 provides a solid, rigid support for the apparatus 10. By way of example but not limitation, the principal support 12 may be manufactured from a single piece of aluminum with the base 15 being 3.0×6.12×0.250 inches and the legs 17 and 19 being 3.0×1.375×0.375 inches. The principal support 12 is fixed to the base plate 14 by threaded fasteners 16.

Fixedly mounted on the base 15 of the principal support 12 is the optical fiber support 24 which, as best shown in FIG. 4, is held in position by the threaded fasteners 22. The optical fiber support 24 provides a fixed support for one end of the fiber optic cable 26. By way of example but not limitation, it may be a 1.750×2.0 inch solid piece of aluminum. Fiber optic cable 26 is held in position on the support 24 by inserting the terminated end of the optical fiber in the precision drilled bore 27 and retaining it therein by means of the set screw 28. The cable 26 can be terminated by known means and it is usually protected against breakage by a metal ferrule (e.g., ferrules 96 and 98) which also absorbs the loading caused by the set screw. Alternatively, one part of a connector can be mounted on the optical fiber support 24 and a mating part of the connector attached to the fiber optic cable 26 so that the fiber optic cable can be connected and disconnected from the optical fiber support 24. However, connectors are not necessary as it is not anticipated that the fiber optic cable 26 will often have to be detached from the support 24 except for replacement due to damage.

Another fiber optic cable 30 is similarly attached to the support leg 33 of the carriage yoke 32 by inserting the optical fiber within ferrule 98 into the precision drilled bore 35 and retaining it therein by means of the set screw 34.

The fiber optic cables 26 and 30 are identical in type and length which is relatively short, i.e., a few feet. The opposite ends of each of the cables 26 and 30 is adapted to be connected to meter or other measuring device to be calibrated. The measuring device can be an attenuation meter or, if desired, some other device for measuring discontinuities in a fiber optic cable. Preferably, standard size optical fibers are used in the cable. By way of example but not limitation, the apparatus 10 can use 0.125/62 μm optical fiber. Of course, other sizes of optical fiber can be used. The cables 26 and 30 are brought out of the simulator 10 through openings in the cover 18 which are lightly sealed by grommets.

The carriage yoke 32 comprises the leg 33, web 43 and leg 37. By way of example but not limitation, carriage yoke 32 is made of a single piece of aluminum with the web 43 being 2.0×3.0×0.250 inches. Leg 37 is 0.87×3.0×0.375 inches and leg 33 is 1.625×3.0×0.375 inches. It should be noted that all aluminum surfaces are anodized in black.

Carriage yoke 32 is slideably mounted on the slide mechanism which includes a pair of steel shafts 36 and 39 fixed in the legs 17 and 19 of the principal support 12. Each of the shafts 36 and 39 is precision manufactured to a uniform diameter (e.g., 0.25 inch) by any conventional manufacturing procedure for accomplishing this purpose, such as centerless grinding. The shafts 36 and 39 support the carriage yoke 32 by extending through properly aligned coaxial bores 60, 62, 64 and 66 in the legs 33 and 37. Bronze bearings 41 are provided in each of the bores. Compression springs 44 and 45 on the shafts 36 and 39 provide a continuous force on the carriage yoke 32 tending to normally open the spacing between the yoke and the optical fiber support 24.

The carriage yoke 32 provides a rigid support for the end of fiber optic cable 30 so that it can be repeatably and accurately displaced along the optical axis that extends between its end 70 and the end 72 of the fiber optic cable 26. The yoke construction accomplishes this purpose by providing two support points for each of the legs 33 and 37 at spaced apart positions along the shafts 36 and 39. This prevents any significant wobble or skewing of the support for the fiber optic cable 30 as it is displaced relative to the support 24. Moreover, this is accomplished with relative ease and without the necessity for resorting to the use of highly precision ground ways or ball bearings.

Figure 3:
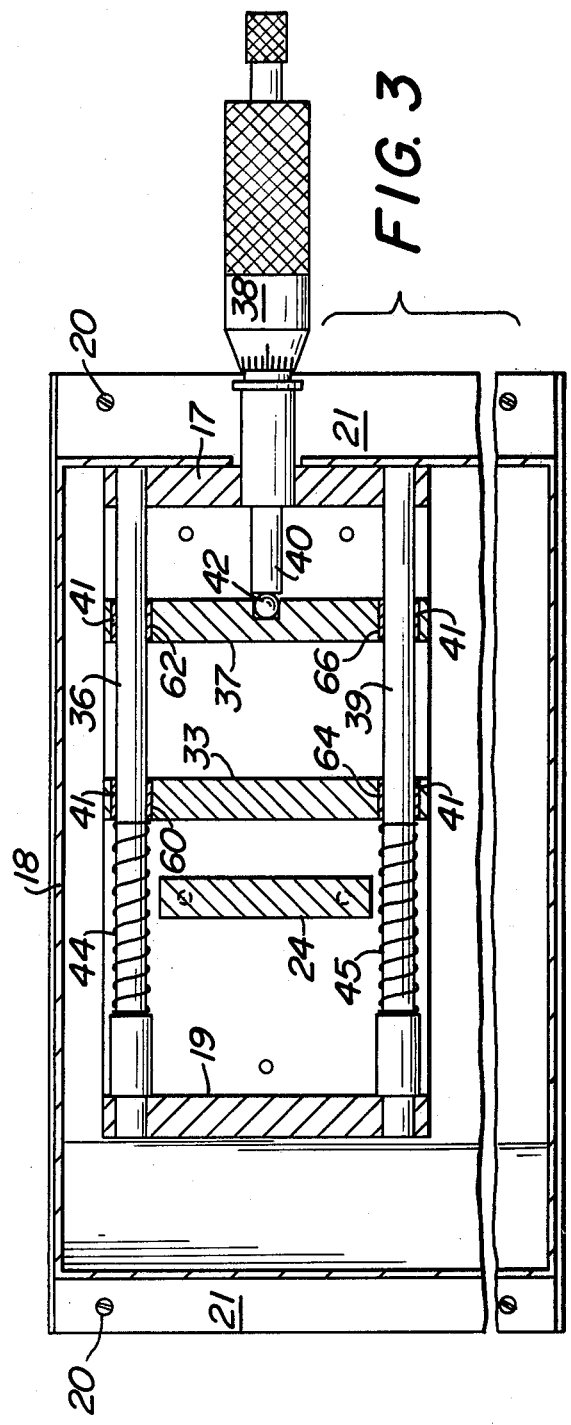
FIG. 3 is a top elevation section taken along the line 3—3 in FIG. 2.

The apparatus 10 simulates attenuation by varying the end separation spacing between the fiber optic cables 26 and 30. The cable ends 70 and 72 are mounted on their respective supports so as to be precisely centered along a common optical axis. As illustrated in FIG. 2, the optical axis also happens to be the physical axis but it need not necessarily be so. Increasing the air spacing between the cables ends increases the attenuation of light passing from one cable to the other. Attenuation is at a minimum when the spacing between the cables is at a minimum and increases as the spacing increases. As described herein, the carriage yoke 32 maintains the cable 30 precisely on the optical axis as it is displaced along the shafts 36 and 39.

Displacement of the carriage yoke 32 is achieved by displacing the spindle 40 by use of an adjustable micrometer screw mechanism 38 similar to the kind used in a micrometer caliper. The micrometer screw adjusting mechanism 38 extends through an opening 50 in cover 18 and is retained by the set screw 52 within a bore in leg 17. Spindle 40 is connected to the leg 37 of the carriage yoke 32 by a snap fit ball bearing 42 fixed to the spindle 40. This type of attachment is useful because it does not require that spindle 40 be precisely aligned with the carriage yoke 32 while at the same time there is no looseness in the connection thereby eliminating imprecision due to backlash. Backlash is also minimized or further reduced by the compression springs 44 and 45 which keep not only the connection but also the screw in the micrometer screw mechanism 38 in constant compression.

The micrometer screw adjusting mechanism 38 for the spindle 40 can be a conventional micrometer in which the spindle 40 is an accurately machined screw (not shown) which is rotated by a thimble 54 within mating screws in the sleeve 56. A scale is provided on the sleeve 56 for indicating the spacing between the ends 70 and 72 of the fiber optic cables 30 and 26, respectively. Preferably, the scale is at a zero setting when the spacing between ends 70 and 72, e.g., zero, is at a minimum.

A fiber optic line simulator made in accordance with what is disclosed herein may have a range of −3dB to −40dB with an insertion loss of −3dB. Deviation from repeatability over the full range is less than 1%. It should be noted that the simulator attenuation 10 is non-linear across its range, but that it is of no consequence as long as it is repeatable.

The present invention may be embodied in other specific forms without departing from the spirit or essential attributes thereof and, accordingly, reference should be made to the appended claims, rather than to the foregoing specification, as indicating the scope of the invention.

What is claimed is:

1. Apparatus for simulating attenuation in a fiber optic cable of significant length, comprising:

first and second foreshortened fiber optic cables, each having one end adapted to be connected to a proximate device for measuring light transmission through said cables and the apparatus, the other end of each of said cables being supported within said apparatus in opposed coaxial relationship along a common optical axis so that light can pass from one cable to the other, support means for axially positioning said other ends of said cables within the apparatus, said support means comprising a first support for the other end of said first cable and a second support for the other end of said second cable, at least one of said first and second supports being a carriage displaceable relative to the other support for adjusting the distance between said other ends of said cables while maintaining them in optical coaxial relation to each other, means for precisely and repeatably controlling the distance between said other ends, and an enclosure for excluding ambient light from the area adjacent said other ends of the first and second cables.

2. Apparatus for simulating attenuation in a fiber optic cable in accordance with claim 1 wherein said first support is fixed in position and said second support is displaceable, said second support comprising slide means and a carriage yoke upon which the other end of one of said cables is fixedly mounted, each leg of said yoke being reciprocably mounted on said slide means at two spaced apart positions, and said means for precisely and repeatably controlling the distance between the ends being connected to said yoke for displacing the same along said slide means.

3. Apparatus for simulating attenuation in a fiber optic cable in accordance with claim 2 wherein said slide means is a pair of rod-like shafts fixedly mounted in position parallel to the optical axis along which the other end of said cable is to be displaced, each of said shafts extending through an opening in each of the legs of said yoke.

4. Apparatus for simulating attenuation in a fiber optic cable in accordance with claim 3 wherein said shafts are rigidly mounted on a pair of upright supports, said carriage yoke being reciprocably mounted to slide on said shafts between said upright supports.

5. Apparatus for simulating attenuation in a fiber optic cable in accordance with claim 4 wherein spring means constantly bias said carriage in one of the directions which it can move.

6. Apparatus for simulating attenuation in a fiber optic cable in accordance with claim 1 wherein said means for precisely and repeatably controlling the distance between said other ends of said fiber optic cables comprises a mechanically displaceable spindle connected to one of the first or second cable supports, said spindle being an accurately machined screw mounted in a sleeve, and scale means associated with said screw calibrated to indicate the distance between said other ends of said optical cables.

* * * * *